Jan. 17, 1956 W. A. DILLMAN 2,731,216
VARIABLE INCIDENCE AIRFOIL SYSTEM
Filed Sept. 23, 1952
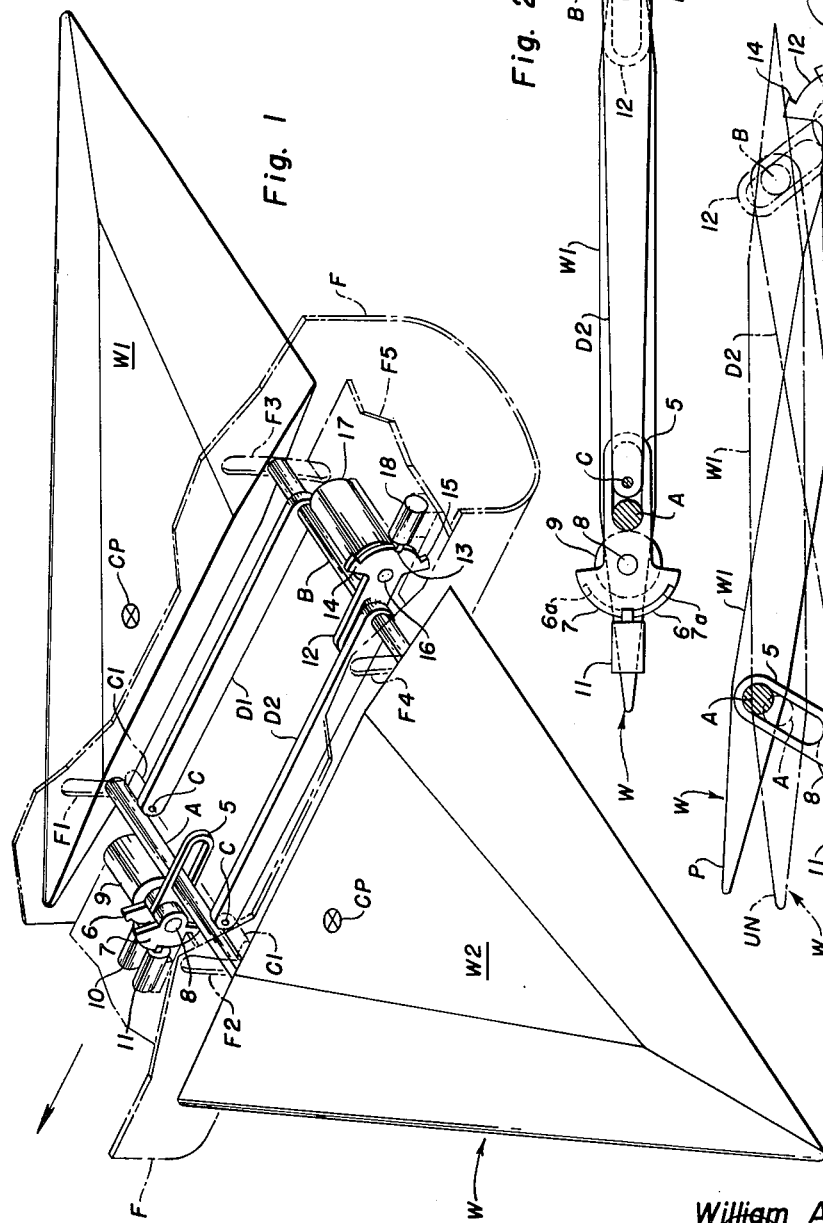
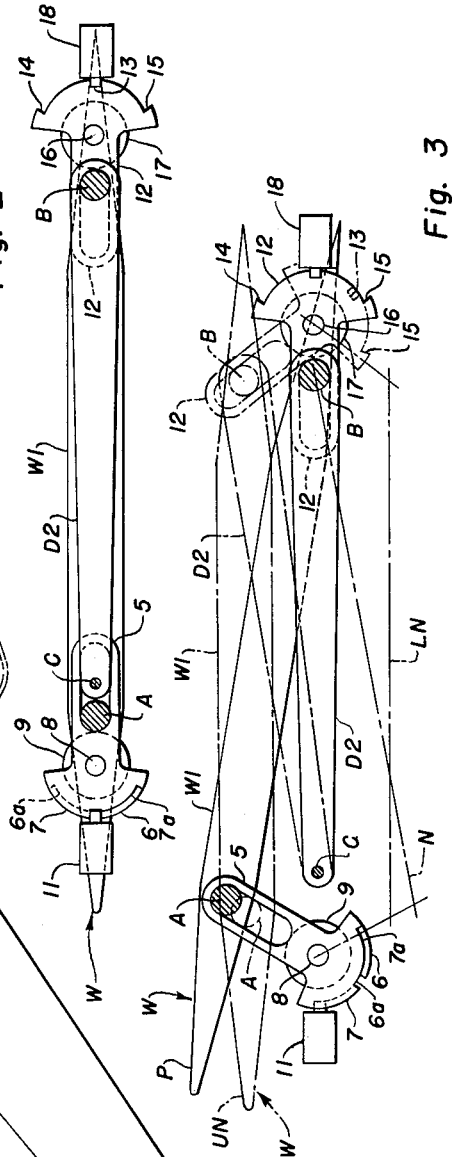
INVENTOR.
William A. Dillman
BY
HIS PATENT ATTORNEY.

United States Patent Office 2,731,216
Patented Jan. 17, 1956

2,731,216

VARIABLE INCIDENCE AIRFOIL SYSTEM

William A. Dillman, Seattle, Wash., assignor to Boeing Airplane Company, a corporation of Delaware Application September 23, 1952, Serial No. 310,995

12 Claims. (Cl. 244—48)

The present invention relates generally to flight controls and more particularly to improved variable incidence wing or control surface arrangements for aircraft, guided missiles and the like.

The design of the control systems for accurately controlling the flight paths of aircraft and guided missiles flying at extremely high speeds has presented numerous difficulties and problems. Among the more important requirements for the satisfactory operation of a control system for such high speed aircraft is the necessity that rapid response to the controls be obtained, and also that the pilot or control forces be adequately augmented or boosted in order that the control surface or other instrumentality be rapidly moved to its displaced position against the relatively large opposing forces of the airstream for the desired movement of the aircraft. Similar problems of somewhat lesser magnitude have been presented for some years to designers of moderate speed aircraft and a number of reasonably satisfactory control arrangements, both of the aerodynamic and mechanical types, have been proposed and used. Of the aerodynamic types the servo tab controls, pressure balance surfaces and others have been widely used, and of the mechanical types adequate boost or increase in pilot forces has been obtained by linkages providing the desired mechanical advantage, hydraulic, electric and mechanical boosts and similar devices.

The present invention comprises essentially a wing or control surface having two translatable pivot points or beams separately supported upon the body or fuselage, one forward and one aft of the center of pressure of the surface. A third pivot point, disposed slightly aft of the forward pivot point and fixed with respect to the body, provides for the transmission of the drag forces from the surface to the body. By connecting a slotted arm and rotary latch means to the forward surface pivot point which holds the pivot in a fixed position at neutral when latched, a means of releasing the surface to either side of the neutral position is accomplished. The latches are preferably spring-pressed and self-locking when the surface is returned to neutral and a stop is provided which limits the surface travel to a predetermined angle on either side of its neutral position. The surface is deflected for control purposes by unlatching the forward latch and initiating the rotation of the forward pivot point or beam by suitable torque means whereupon the lift forces rapidly complete the movement of the surface to the deflected position. The surface is brought back to the neutral position by unlocking the aft rotary latch permitting the surface to swing into the offset streamlined position and subsequently deflecting the leading portion of the surface back to its mid-position and then aligning the aft portion with the leading portion in the mid-neutral position of the surface by the negative lift exerted upon the surface.

The present invention differs appreciably from prior efforts to provide adequate control at extremely high speeds by the provision of an arrangement wherein the control of the aircraft is provided by varying the incidence of the entire wing or control surface. The present invention, by means of a relatively simple wing mounting mechanism, provides an arrangement which utilizes the wing lift and drag as the prime movers for the wing incidence changes. The improved mounting arrangement and actuating mechanism is also arranged such that it triggers the various movements upon the application of relatively small control forces permitting the wing to assume its full angle of incidence in either of two directions. The magnitude of the controlled movement of the aircraft with the present control arrangement is obtained by permitting the wing to remain hard over in either position for the desired length of time, and accordingly such a wing may preferably be referred to as a time-modulated wing.

It is accordingly a primary object of the present invention to provide an improved control arrangement or system for accurately controlling the flight path of aircraft and guided missiles flying at extremely high speeds. It is a further object to provide such a control system in which an extremely rapid response to the controls is obtained. It is a still further objective of the present invention to provide an improved structure and a method of obtaining a rapid change in direction of the craft by using the lift forces to move the control surface and a corollary objective is the use of the entire wing as the control surface. Other objectives reside in the improved relationship of the respective components of the disclosed control arrangement and actuating mechanism as well as in the details of the respective parts.

Other objects and advantages of the present invention will occur to those skilled in the art after reading the following description, taken in conjunction with the accompanying drawings, forming a part hereof, in which;

Fig. 1 is a perspective view of the wings and a portion of the fuselage broken away to show a form of the present control arrangement;

Fig. 2 is a transverse sectional view of a wing and the control mechanism in the neutral position shown in Fig. 1; and Fig. 3 is a similar view showing an adjusted position of the wing and control mechanism of Fig. 2.

Referring now to Fig. 1, the letter F represents a portion of the fuselage partially broken away to more clearly show the support and adjusting mechanism for the wing W. The wing is of the high speed highly swept back plan form, or substantially delta type wing, being comprised of the right and left wing portions W1, and W2, respectively, interconnected by the forward and rear wing pivot beams or spars A, and B, respectively. The center of pressure is indicated for each wing by the letters CP and the wing is mounted on the two transverse beams with one beam A forward of the center of pressure and the other beam B aft of the center of pressure. Each of the wing beams A and B is movably supported within the fuselage F and slotted openings F1, F2, F3 and F4 are provided through the fuselage walls to permit of the substantially vertical and arcuate movements of the beams A and B.

The front and rear pivot beams A and B are movably mounted within the fuselage such that from the mid-neutral position shown in Figs. 1 and 2, the beam A can be raised to provide a positive angle of attack for a climbing attitude of the aircraft, or alternatively the front beam A may be lowered from its mid-neutral position shown to provide a negative angle of attack of the wing W for a diving attitude of the airplane. Similarly the rear wing beam B may also be raised and lowered in sequence after the raising and lowering of the front beam A to restore the wing W to its streamlined and subsequently its mid-neutral position at the end of the requirement of the application of the control force. Before describing in detail, however, the support and adjusting mechanism for the wing beams A and B, it will be noted that a pair of transversely aligned pivots C are provided upon the fuselage supports C1. These pivots provide the forward pivotal support for a pair of longitudinally extending drag arms or struts D1 and D2 which are pivotally connected at their rear terminals upon the rear wing beam B. Accordingly all of the drag forces to which the high speed wing W is subjected are transmitted to the fuselage through the rear beam B and the drag arms D1 and D2 to the fuselage pivots C and pivotal supports C1. It will be noted that the axis of the pivots C is just aft of that of the front beam A and the drag arms D1 and D2 confine the path of movement of the rear beam B to that arcuate path in a generally vertical direction having the axis of the pivot C as its center.

The movable support for the forward beam A consists of the rotatable slotted arm 5 having two opposed arcuate latch plates 6 and 7 fixedly or integrally mounted upon its forward portion and mounted for pivotal movement upon the shaft 8 of the torque motor 9. The latter is preferably an electric motor of the geared down reversible type with adequate starting torque and an over-running clutch or its equivalent. Where the displacement forces are within suitable limits a rotary actuator may be utilized such as for example the "Ledex" type rotary solenoid as manufactured by G. H. Leland, Inc., of Dayton, Ohio. As may be more clearly seen in Figs. 2 and 3, the latch plate 6 is provided with an arcuate notch 6a at its upper portion and the latch plate 7 is provided with a similar arcuate notch 7a at its lower portion, these notches 6a and 7a being arranged such that they overlap sufficiently in the neutral position shown in Fig. 2 to be engaged by the respective tongues of the spring-loaded solenoid-actuated latches 10 and 11. Each latch plate 6 and 7 is accordingly normally prevented from rotating in a given direction by the other spring-loaded latch, either 10 or 11. In other words from the neutral position shown in Figs. 1 and 2, upward movement of the wing beam A by imparting counter-clockwise movement to the slotted arm and latch plate assembly 5—6—7 about the pivot 8, is opposed by the tongue of the spring-loaded latch 11, although the tongue of the latch 10 would not oppose such counter-clockwise movement of the latch plate 6. Accordingly, in order to raise the wing beam A to impart positive incidence to the wing W it is necessary that the solenoid be energized for the latch 11 to withdraw its tongue forwardly from engagement with the projecting sector on the latch plate 7, whereupon operation of the torque motor 9 in the counterclockwise direction causes initial lifting of the slotted arm 5 and the wing beam A to the point where the increased lift exerted beneath the wing at its center of pressure causes the leading portion of the wing to be raised to its upper limit to the position of positive angle of attack as indicated by the letter P in Fig. 3.

The positioning of the aft beam B is similarly accomplished in the vertical direction along the arcuate path defined by the drag arms D1 and D2 by means of the spring-loaded solenoid-actuated latch plate 12. This latch plate 12 is provided with a central notch 13 and end stops 14 and 15 at the end of its arcuate face and is similarly mounted upon the shaft 16 of the rear torque motor 17, which is preferably similar to the torque motor 9 referred to above. The forward latch plate 6—7 is of the double type, either latch plate limiting the rotation of the slotted arm 5 upon release of the other, whereas the latch plate 12 is of the single type with a central notch. As in the case of the front slotted arm 5, however, embracing the front wing beam A, the rear slotted arm 12 embraces the rear beam B. Similarly a spring-loaded solenoid-actuated latch 18 is provided such that its tongue may selectively engage or be disengaged from the central notch 13 of the latch plate 12 as shown engaged in the full line position in Fig. 3 in which the rear beam B is held in its intermediate or mid-neutral position for the raised leading edge or positive angle of incidence position P.

The movement of the rear pivot or beam B is controlled by the slotted arm of the plate 12, by which it is embraced, and the integral latch plate having the central notch 13 and the end stops 14 and 15 of its arcuate sector. The latch plate 12 is fixed to the shaft 16 of the torque motor 17 and the plate is automatically latched or locked in the central position by the tongue of the spring-loaded solenoid-actuated latch 18, being withdrawn when the solenoid is energized. The torque motor 17 is also provided with over-running and free-wheeling means to insure that it does not interfere with the aerodynamic lift-actuated movements of the latch plate and arm assembly 12.

The operation of the improved control arrangement is accordingly as follows: let us assume that the wing W is in its neutral and mid-position as shown in Figs. 1 and 2 and it is desired to move the wing into its increased incidence angle or to its positive angle of attack as indicated by the letter P in Fig. 3. The solenoid for the spring-loaded latch 11 is energized, withdrawing the latch tongue forwardly, and counterclockwise rotation of the torque motor 9 is imparted to the slotted arm and latch plate assembly 5—6—7 about the axis of the pivotal mounting on the shaft 8 to which it is fixed, initiating upward movement of the pivot beam A. As soon as the leading edge of the wing W has been raised slightly by the action of the torque motor 9, the aerodynamic forces acting upon the lower surface of the wing triggers the wing into its positive angle of attack position indicated by the letter P in Fig. 3, rotating the wing about the fixed pivot provided by its rear beam B, which is still maintained and locked in its neutral and mid-position. The limit stops for limiting the upward movement of the leading edge of the wing have been arranged to limit the wing travel to approximately 10° in either direction, but this angle may be increased or decreased at will to meet the individual requirements of a given design. It will be noted that while relatively little power is required to initiate the lifting of the leading edge of the wing W, an adequate force from the action of the air stream in the form of lift on the undersurface of the wing is available to rapidly move the wing into the extreme upward position of its leading portion. Suitable over-running and lost-motion means is provided within the torque motor 9 to permit over-running of the latch plate as well as its reversal of direction.

As soon as the need for the climbing control has ceased and it is desired to bring the control surface or wing W back to its neutral position, the solenoid of the spring-loaded latch 18 is energized, drawing the tongue rearwardly out of the notch 13 in the latch plate 12. This immediately permits the action of the airstream exerted at the center of pressure of the wing to lift the aft portion upwardly to its limit position in which the wing assumes the streamlined or alined construction line position shown in Fig. 3 indicated by the reference numerals UN for the upper neutral position. It will be noted that as the rear portion of the wing is lifted, it is swung upwardly and slightly forwardly due to the restraint of the drag arms D1 and D2 which transmit all of the drag forces acting upon the wing W to the fuselage supported pivots C.

The wing W is now in an upper neutral position UN in which the climbing attitude is no longer imparted to the aircraft but it is desirable to immediately return the wing to its neutral mid-position from which either climbing or dive controls may be subsequently obtained from its adjustment. Accordingly, in order to bring the wing W back to its mid-neutral position from the position indicated by the reference numerals UN in Fig. 3, the torque motor 9 is energized to impart clockwise rotation to its pivot shaft 8 as seen in Fig. 3 and the front wing beam A is caused to move downwardly to the position where the center of pressure acting upon the upper surface of the wing causes the leading edge to be depressed to its mid-position at which the tongues of the latches 10 and 11, under the influence of their springs, latch the slotted arm 5 in its neutral position where the front beam A is retained just forward of the pivot C as shown in Fig. 2. Closely following the dropping of the leading edge of the wing, in order not to impart a prolonged diving movement to the aircraft, the downward force acting upon the upper surface of the wing, causes it to pivot in a clockwise direction about the front beam A. As soon as the rear portion of the wing W reaches its mid-neutral position the tongue of the spring-actuated latch 18 engages the notch 13 and the wing is again locked front and aft in its mid-neutral position. From this position, when it is desired to impart a diving movement to the aircraft it will be obvious that the solenoid of the spring-loaded latch 10 is energized to permit clockwise rotation of the torque motor 9 and its attached latch plate assembly to move the front wing beam A downwardly such that the wing assumes the general negative angle of attack position indicated by the reference numeral N in Fig. 3. After the desired diving movement has been imparted to the aircraft the aft portion of the wing is lowered such that the wing attains the lower neutral or streamlined position indicated by the reference numerals LN, from which the wing can again be restored to its mid-neutral position by first raising the front wing beam A and subsequently the rear wing beam B.

It will accordingly be noted that there has been described above a preferred form of a control arrangement based upon a variable incidence wing or control surface and a unique method for its operation, namely, the four steps for obtaining the change in aircraft flight attitude employing lift forces imposed upon the surface by the airstream to vary the incidence of the surface. It will be more specifically understood from the above that the wing is mounted on two displaceable transverse beams which are so attached to the aircraft forward and aft of the center of pressure of the wing that the forward beam when released rotates about the rear beam axis, and the rear beam when released rotates about the axis of the drag arms adjacent to the axis of the forward beam. The four (4) steps in the control sequence accordingly may be described as follows: (1) release of the forward beam which takes a position to vary the angle of incidence of the wing in a direction depending upon the direction imparted to it by the torque motor; (2) release of the rear beam which allows the wing to take a neutral or streamlined position; (3) return of the forward beam to mid-neutral position after being started in that direction by the torque motor; and (4) return of the rear beam to its mid-neutral position in which the solenoid-operated spring latches re-engage both the front and rear beams to hold the wing in its fixed mid-neutral position with respect to the fuselage.

While the wing W has been shown and described as the main sustaining surface of the aircraft it will be understood that it may also be the tail surface of an aircraft for similarly imparting dive and climb control movements to the craft. While the control of the surface in the foregoing disclosure is analogous to that obtained by the conventional elevator control of an airplane it will be understood that the wings W1 and W2 may preferably be separated and controlled individually to provide the equivalent of an aileron or roll control of the craft. Similarly it will also be obvious that one of the two surfaces shown may be mounted vertically upon the fuselage and similarly controlled to provide a rudder or directional control.

Other forms and modifications of the present invention both with respect to its general arrangement and the details of its respective parts, are all intended to come within the scope and spirit of this invention, as more particularly defined in the appended claims.

I claim:

1. In an aircraft control system, a body, a high speed wing having front and rear transverse members passing through said body, longitudinally extending drag means pivotally mounted at a forward terminal to said body and pivotally engaging said rear member at its aft terminal for the transmission of drag forces from said wing through said rear member and said drag means to said body, said front and rear members disposed fore and aft respectively of the center of the pressure of said wing, positioning and mounting means including a lever pivotally mounted upon said body having a guide slot engaging said front member, and actuating means carried upon said body for selectively displacing said front member in a rapid movement from its neutral position with the assistance of the airstream including a torque device for imparting rotation to said slotted lever and a pair of spring-loaded solenoid-actuated latches integrally mounted upon said slotted lever.

2. In an aircraft control system including a longitudinally extending body and a transversely extending surface, a transversely extending member fixed to a forward portion of said surface slidably mounted for arcuate movement within said body, a transversely extending rear member fixed to an aft portion of said surface rotatively mounted within said body, and means including a power driven arm pivotally supported upon said body in sliding engagement with said forward member for selectively moving said forward member of said surface in a direction perpendicular with respect to the longitudinal axis of said body.

3. In an aircraft control system including a longitudinally extending body and a transversely extending surface, a transversely extending member fixed to a forward portion of said surface movably mounted for vertical movement with respect to said body, means including a slotted arm pivotally mounted upon said body and slidingly engaging said member for deflecting said surface forward portion vertically into the airstream, a transversely extending rear member fixed to an aft portion of said surface movably mounted upon said body, and means including a longitudinally extending link pivotally supported upon said body adjacent a forward terminal and in pivotal engagement with said rear member adjacent a rear terminal for transmitting to said body the drag forces exerted upon said surface by the airstream.

4. Means for mounting a movable surface upon a body movable through an airstream including a guide member pivotally mounted upon said body operatively engaging said surface at a first portion, said surface pivotally mounted upon said body at a second portion of said surface spaced in the chordwise direction from said first portion and a torque device operatively connected to said pivotally mounted guide member for rotating said guide member about its pivotal mounting upon said body for movement of said first portion of said surface to a position laterally displaced from its normal chordwise axis and at an angle of incidence with respect to said body at which the airstream reacting upon said surface causes said surface to be moved rapidly to a predetermined position.

5. Mounting means of the type called for by claim 4 characterized by said surface having a chordwise axis normally disposed parallel to the longitudinal axis of said body in the neutral position of said surface with respect to said body, and said movement and predetermined limit position of said first portion of said surface being defined by the length of said rotated guide member.

6. Mounting means of the type called for by claim 4 characterized by said surface having a chordwise axis normally disposed parallel to the longitudinal axis of said body in the neutral position of said surface with respect to said body, and the inclusion of a link pivotally connected at a first terminal upon said body and pivotally connected at its second or opposite terminal to said surface to cooperate with said guide member in defining the extent of movement of said first portion of said surface.

7. In an aircraft control system including a body and a movable control surface, a member fixed to a forward portion of said surface movably mounted within said body, a rear member fixed to an aft portion of said surface movably mounted within said body, a longitudinally extending link pivotally supported upon said body in engagement with said rear member for transmitting the drag forces exerted upon said surface to said body, surface mounting means including a slotted lever engaging said forward member, solenoid-actuated latch means carried by said body selectively engageable with said slotted lever for normally retaining said forward member in a fixed neutral position with respect to said body, and torque means in engagement with said slotted lever for selectively imparting displacement to said forward member from said normally fixed neutral position for the controlled displacement of said control surface with respect to said body.

8. In an aircraft control system, a longitudinally extending body, a movable surface having a center of pressure, said surface disposed contiguous to and extending from an external surface of said body, a transversely extending member fixed to a forward portion of said surface and movably mounted within said body, control means including a slotted arm pivotally supported within said body movably mounting said surface forward portion within said body, a transversely extending rear member fixed to an aft portion of said surface and movably mounted within said body, further control means including a second slotted arm pivotally supported within said body movably mounting said rear member within said body, said forward and rear members disposed fore and aft of said center of pressure of said surface, power means associated with both said control means for separately imparting deflected movements to said surface with respect to said body about the axes of said forward and rear members which movements are triggered into predetermined positions by the effect of the airstream on said surface, and link means pivotally supported upon said body at a forward portion and its pivotal engagement with said rear member at an aft portion for transmitting to said body the drag forces exerted upon said surface, said link means rotatable about said forward pivotal support upon deflected movements of said surface.

9. In an aircraft control system including a longitudinally extending body, and a movable control surface extending laterally from said body in a normally neutral attitude, a transverse beam member fixed to a forward portion of said surface movably mounted within said body, a rear transverse beam member fixed to an aft portion of said surface movably mounted within said body, longitudinally extending link means pivotally supported upon said body at its forward terminal and in pivotal engagement with said rear beam member for transmitting to said body the drag forces exerted upon said surface by the airstream, and control means including motor-driven members pivotally mounted upon said body for selectively retaining and moving each said forward and rear beam members about the axis of the other beam member and with respect to said body to thereby impart rotation to said surface about both said forward and rear members respectively to positions of positive or negative incidence toward and away from said neutral attitude as determined by said motor-driven members and said drag link means.

10. A variable incidence airfoil system comprising a body movable within an airstream, an airfoil pivotally supported upon said body in a normally neutral attitude upon longitudinally spaced axes disposed toward the leading and trailing portions, respectively, of said airfoil, power-actuated means operatively engaging the leading pivotal support of said airfoil for displacing said leading portion of said airfoil in a first direction for initial rotation of said airfoil about said trailing edge pivotal support into a deflected position at which the airstream acting upon said airfoil imparts further rapid rotation of said airfoil about said trailing edge pivotal support to a predetermined position of positive attitude determined by said power-actuated means.

11. A variable incidence airfoil system of the type called for by claim 10 characterized by the inclusion of a second power-actuated means operatively engaging the trailing pivotal support of said airfoil for release of the trailing portion of said airfoil in said first direction but opposite rotation about said displaced leading pivotal support such that the airstream acting upon said airfoil imparts further rapid rotation to said airfoil to a predetermined second position of neutral attitude determined by the second said power-actuated means displaced from and parallel to said first neutral attitude position.

12. A variable incidence airfoil system of the type called for by claim 10 characterized by the inclusion of a drag member pivotally mounted upon the body adjacent a forward terminal of said member in the region of said first pivotal support, said drag member pivotally connected adjacent a trailing terminal to the trailing pivotal support of said airfoil whereby both said pivotal supports of said airfoil upon said body are substantially relieved of the drag forces imposed by the airstream upon said airfoil and a portion of said drag forces are transmitted through said drag member to said body.

References Cited in the file of this patent

UNITED STATES PATENTS

| | | |
|---|---|---|
| 1,351,918 | Lawrence | Sept. 7, 1920 |
| 1,777,279 | Anderson | Oct. 7, 1930 |
| 1,787,370 | Hall | Dec. 30, 1930 |
| 2,141,984 | Hilmy | Dec. 27, 1938 |
| 2,160,089 | Schairer | May 30, 1939 |
| 2,504,767 | Wallis | Apr. 18, 1950 |